No. 724,157. PATENTED MAR. 31, 1903.
A. W. BLANCHARD.
TIRE DETACHER.
APPLICATION FILED AUG. 20, 1902.
NO MODEL.
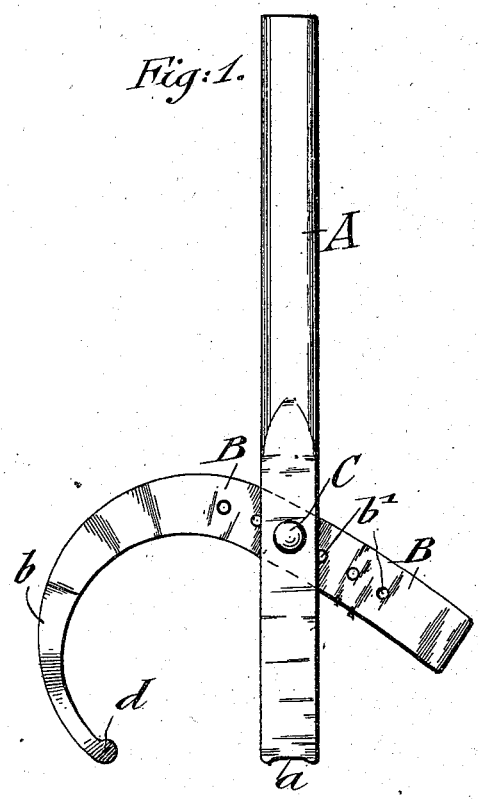
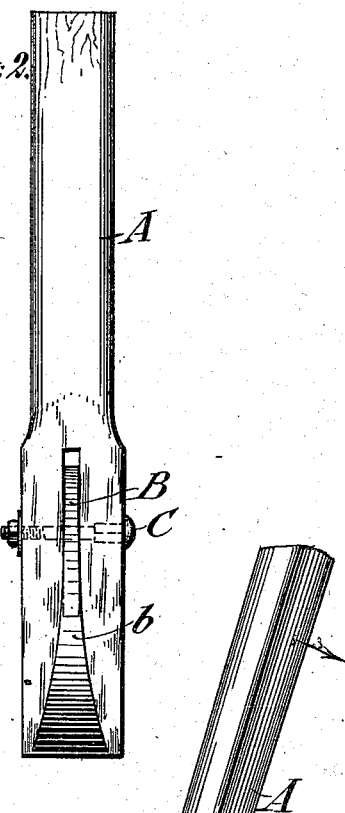
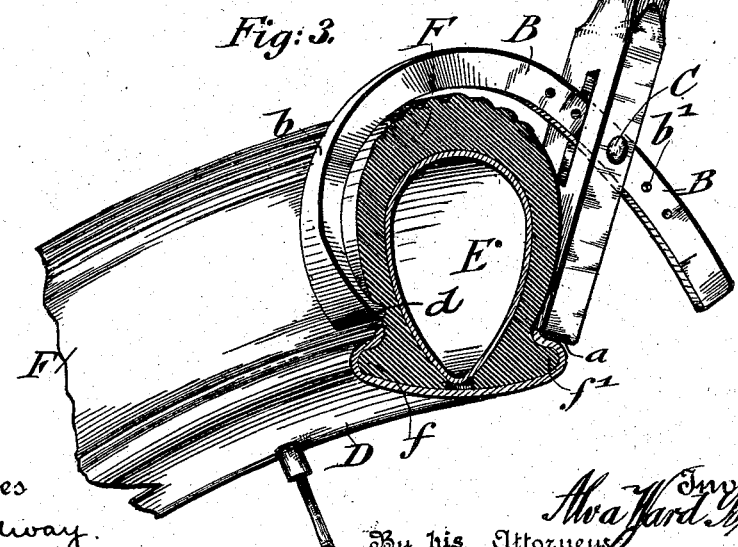

UNITED STATES PATENT OFFICE.

ALVA WARD BLANCHARD, OF NEW YORK, N. Y., ASSIGNOR OF ONE-HALF TO WILLIAM H. C. LEVERICH, OF NEW YORK, N. Y.

TIRE-DETACHER.

SPECIFICATION forming part of Letters Patent No. 724,157, dated March 31, 1903.

Application filed August 20, 1902. Serial No. 120,310. (No model.)

*To all whom it may concern:*

Be it known that I, ALVA WARD BLANCHARD, a citizen of the United States, residing in New York, borough of Brooklyn, in the State of New York, have invented certain new and useful Improvements in Tire-Detachers, of which the following is a specification.

Pneumatic tires for automobiles and other vehicles are made in various types of construction, of which a prominent type for the heavier vehicles of the automobile class is that known as the "Clincher" tire. This tire consists commonly of two tubes, the inner of which, called the "pneumatic," is air-tight and provided with an inflation-valve. The outer tube, termed the "shoe," is not air-tight, but is open at its inner periphery and is provided with two ridges or heels, one at either side of the inner periphery, which are adapted to take into corresponding grooves in the rim of the wheel. When the tire is applied and the pneumatic inflated, the pressure of the same against the outer tube or shoe forces the heels into the grooves of the rim and retains them there, the tire being thereby held in place on the wheel-rim. When it is desired to remove the tire, the air is permitted to escape through the valve, whereupon by manipulating the tire by hand, as by pushing the same inwardly adjacent the rim, the ridges or heels are forced out of their seats in the rim, and the shoe and pneumatic may then be removed from the wheel. By long-continued use at high pressure the heels seat themselves very firmly in the grooves of the rim, and when these grooves are made, as is customary and necessary, of a somewhat wedge-shape cross-section it is often very difficult to remove the tire after deflating. The heels are wedged into the grooves of the rim and frictionally held with such tenacity that it is often impossible to remove the tire by hand manipulation. It is frequently the case also that the rim, which is made of sheet metal, becomes jammed in one or more places by a stone or stones and the groove thereby closed more tightly upon the tire-heel, which increases the difficulty of removing the tire when it is desired to do so.

The object of this invention is to provide a tool or device by which the tire under these conditions can be conveniently and readily released from the rim. The tool must be powerful, simple, capable of being quickly operated, adaptable to tires of different sizes, and one which will not injure the tire though considerable force be applied.

For carrying out these purposes my invention consists of a tire-detacher comprising a lever adapted to be placed at one side of the tire to be removed, an arm pivoted to said lever and extending to the other side of the tire, a flattened and curved nose on said arm adapted to bear against the tire, and a transverse grip-lug extending across the outer end of said flattened nose and projecting inwardly from the same toward the lever.

In the accompanying drawings, Figure 1 represents a side view of my improved tire-detacher. Fig. 2 is a view at right angles to Fig. 1; and Fig. 3 is a perspective view of the tire-detacher shown as applied to a tire for releasing the same from the wheel-rim, the tire and rim being shown in section.

Similar letters of reference indicate corresponding parts.

Referring to the drawings, A indicates the lever of the tire-detacher, which is preferably made of wood and rounded at its upper portion in the form of a handle. An arm B is pivoted to the lever at a suitable distance from the lower end of the same and provided at its outer portion with a flattened and curved nose $b$, said nose being curved so as to receive and bear with increasing pressure toward the outer end against the tire to be detached. At the outer portion of the nose is located a grip-lug $d$, which extends transversely across the flattened nose, is of rounded form, and projects inwardly from the nose toward the lever, as clearly shown in Fig. 1. When the tire is deflated for removing and the tire-detacher applied in the manner indicated in Fig. 3, this grip-lug sinks slightly into the shoe and prevents the nose and rim from slipping and sliding off the tire, owing to the flabby condition of the latter.

For adapting the detacher to tires of different sizes the rim B is provided with a series of holes $b'$ and is pivoted to the lever A by means of a carriage-bolt C or other suitable removable pivot, so that by removing the bolt, shifting the arm, and reinserting the bolt the space between the nose $b$ and the lower portion of the lever is adjusted to the desired dimensions. The lower end of the lever may bear against the tire at the opposite side of the same from the nose $b$, but will ordinarily bear against the rim and tire together, and for retaining it in proper position engaged with the rim the lower end of the lever is preferably provided with a recess $a$, adapted to receive the rim.

D indicates the rim; E, the pneumatic of the tire; F, the shoe, and $f$ $f'$ the heels of the latter.

For removing the tire the same is deflated and the tire-detacher applied so that the lower end of the lever bears against the rim at one side or against the rim and tire together and the curved nose $b$ of the arm against the tire at the opposite side of the same. Pressure is then applied so as to move the lever in the direction indicated by the arrow in Fig. 3. By this operation the heel $f$ is forced in inward direction and loosened from the rim. This loosening having been effected at one point, the detacher without being removed from the tire is now shifted slightly along the same, pressure again applied, and the detacher again shifted, the wheel being turned as required so as to bring all parts of the same to the detacher, if desired, instead of moving the detacher around the tire. By this means the entire circumference of the tire can be quickly and conveniently loosened from the rim without damaging the tire and with little expenditure of energy. When loosened, the tire may then be removed in the usual manner.

Having thus described my invention, I claim as new and desire to secure by Letters Patent—

1. A tire-detacher, consisting of a lever adapted to engage the wheel-rim at one side of the tire to be detached, an arm pivoted to said lever, a curved and flattened nose on said arm adapted to bear against the opposite side of the tire, and a rounded grip-lug extending transversely across said nose at the outer portion of the same and projecting inwardly from said nose toward the lever, substantially as set forth.

2. A tire-detacher, consisting of a lever adapted to engage the wheel-rim at one side of the tire to be detached and provided at its lower end with a recess adapted to receive the wheel-rim, an arm pivoted to said lever, a curved and flattened nose on said arm adapted to bear against the opposite side of the tire, and a rounded grip-lug extending across said nose at the outer end of the same and projecting inwardly from said nose toward the lever, substantially as set forth.

3. A tire-detacher, consisting of a lever adapted to engage the rim at one side of the tire to be detached and provided with a recess adapted to receive the wheel-rim, an arm pivoted to said lever, means for pivoting said arm at different points in its length to said lever, a curved and flattened nose on said arm adapted to bear against the opposite side of the tire with increasing pressure, and a rounded grip-lug extending across said nose at the outer end of the same and projecting inwardly from said nose toward the lever, substantially as set forth.

In testimony that I claim the foregoing as my invention I have signed my name in presence of two subscribing witnesses.

ALVA WARD BLANCHARD.

Witnesses:
JOSEPH H. NILES,
HENRY J. SUHRBIER.